US008304137B2

United States Patent
Yanagisawa

(10) Patent No.: US 8,304,137 B2
(45) Date of Patent: Nov. 6, 2012

(54) FUEL CELL HOUSING STRUCTURE

(75) Inventor: Masanari Yanagisawa, Kawasaki (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 13/427,564

(22) Filed: Mar. 22, 2012

(65) Prior Publication Data

US 2012/0183883 A1    Jul. 19, 2012

Related U.S. Application Data

(62) Division of application No. 12/692,191, filed on Jan. 22, 2010, now Pat. No. 8,168,336, which is a division of application No. 11/154,957, filed on Jun. 17, 2005, now Pat. No. 7,674,547.

(30) Foreign Application Priority Data

Jun. 18, 2004  (JP) ................................ 2004-181235

(51) Int. Cl.
 *H01M 8/04* (2006.01)
(52) U.S. Cl. ...................................................... 429/512
(58) Field of Classification Search ................... 429/512
 See application file for complete search history.

(56) References Cited

U.S. PATENT DOCUMENTS

| 2002/0127440 A1 | 9/2002 | Yamamoto et al. |
| 2004/0033409 A1 | 2/2004 | Coerlin et al. |

FOREIGN PATENT DOCUMENTS

| JP | H08-031441 A | | 2/1996 |
| JP | 10284105 A | * | 10/1998 |
| JP | H10-284105 A | | 10/1998 |
| JP | 2002-367647 A | | 12/2002 |
| JP | 2002-373685 A | | 12/2002 |
| JP | 2004-047211 A | | 2/2004 |
| JP | 2004-134181 A | | 4/2004 |

OTHER PUBLICATIONS

The Office Action of corresponding Japanese Application No. 2004-181235, dated Jan. 13, 2011 and mailed Jan. 18, 2011.

* cited by examiner

*Primary Examiner* — Karie O'Neill Apicella
(74) *Attorney, Agent, or Firm* — Global IP Counselors, LLP

(57) ABSTRACT

A fuel cell housing structure includes a fuel cell, an electrically insulated housing, a vent gas intake port and a vent gas exhaust port. The electrically insulated housing contains the fuel cell. The housing is arranged to provide a space within the housing surrounding the fuel cell. At least one of the vent gas intake port and the vent gas exhaust port is fluidly connected to the space at a position above or on the same level as the fuel cell. The at least one of the vent gas intake port and the vent gas exhaust port forms at least one of: vertically extending opening that opens to the external environment, and an opening that faces the space in a direction other than a direction facing the fuel cell.

17 Claims, 2 Drawing Sheets

FUEL CELL HOUSING STRUCTURE

CROSS-REFERENCE TO RELATED APPLICATIONS

This application is a divisional of U.S. patent application Ser. No. 12/692,191, filed on Jan. 22, 2010, which is a divisional of U.S. patent application Ser. No. 11/154,957, filed on Jun. 17, 2005, now U.S. Pat. No. 7,674,547. The present application claims priority under 35 U.S.C. §119 to Japanese Patent Application No. 2004-181235, filed on Jun. 18, 2004. The entire disclosures of U.S. patent application Ser. No. 11/154,957, U.S. patent application Ser. No. 12/692,191 and Japanese Patent Application No. 2004-181235 are hereby incorporated herein by reference.

BACKGROUND OF THE INVENTION

1. Field of the Invention

The invention relates to a structure for a ventilated fuel cell casing or housing for a fuel cell.

2. Description of Related Art

Japanese Laid Open Patent Publication 2002-373685 describes a fuel cell housing structure in which a fuel cell is encased in a housing, and in which vent gas intake and exhaust ports are connected to the top part of the housing to vent out leaking hydrogen gas which easily accumulates in the top part of the housing.

SUMMARY OF THE INVENTION

The fuel cell housing structure according to the present invention is capable of preventing a reduction in insulation resistance between the fuel cell and fuel cell housing resulting from water entering a port and flowing from the fuel cell to the housing.

According to one aspect, a fuel cell housing structure comprises a fuel cell, and an electrically insulated housing containing the fuel cell. The housing is arranged to provide a space surrounding the fuel cell. A vent gas port is provided in the housing, and connects to the space at a position above or on the same level as the fuel cell. The fuel cell housing structure includes means for blocking water that enters the housing from the vent gas port from contacting the fuel cell. The means for blocking water may be electrically insulated from the fuel cell.

The means for blocking water that enters the housing from the vent gas port from contacting the fuel cell may be a blocking plate installed within the housing at a location facing the opening of at least one of the vent gas intake port and the vent gas exhaust port; a pipe, one end of the pipe being installed in the housing at an opening of at least one of the vent gas intake port and vent gas exhaust port, a remaining end of the pipe extending into the space within the housing in a direction other than a direction facing the fuel cell; or a port, one end of the port extending into the space within the housing and having an orifice that faces in a direction other than a direction facing the fuel cell; and/or combinations of, or variations of, these structures. The opening or orifice at the end extending into the space within the housing or remaining end of the pipe may face vertically downward.

In still another aspect, a fuel cell housing structure includes a fuel cell, and an electrically insulated housing containing the fuel cell, the housing arranged to provide a space within the housing surrounding the fuel cell. A vent gas intake port and a vent gas exhaust port are provided in the housing. At least one of the vent gas intake port and the vent gas exhaust port connects to the space at a position above or on the same level as the fuel cell. At least one of the vent gas intake port and the vent gas exhaust port is provided with a vertically disposed opening that opens to the external environment, and an opening that faces the space in a direction other than a direction facing the fuel cell. Optionally, at least one of the vent gas intake port and the vent gas exhaust port is formed in the top of the housing at a location not in horizontal alignment with the fuel cell.

Other exemplary embodiments and advantages of the present invention may be ascertained by reviewing the present disclosure and the accompanying drawings.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein.

DETAILED DESCRIPTION OF THE PREFERRED EMBODIMENTS

The following will explain, with reference to the above-described drawings, preferred embodiments of the present invention, in which like characters represent like elements. The particulars shown herein are by way of illustrative example of the embodiments of the invention only and are presented in the cause of providing what is believed to be the most useful and readily understood description of the principles and conceptual versions of the present invention. In this regard, no attempt is made to show structural details of the invention in more detail than is necessary for the fundamental understanding of the present invention, the description taken with the drawings making apparent to those skilled in the art how the several forms of the present invention may be embodied in practice.

First Embodiment

Figure 1:
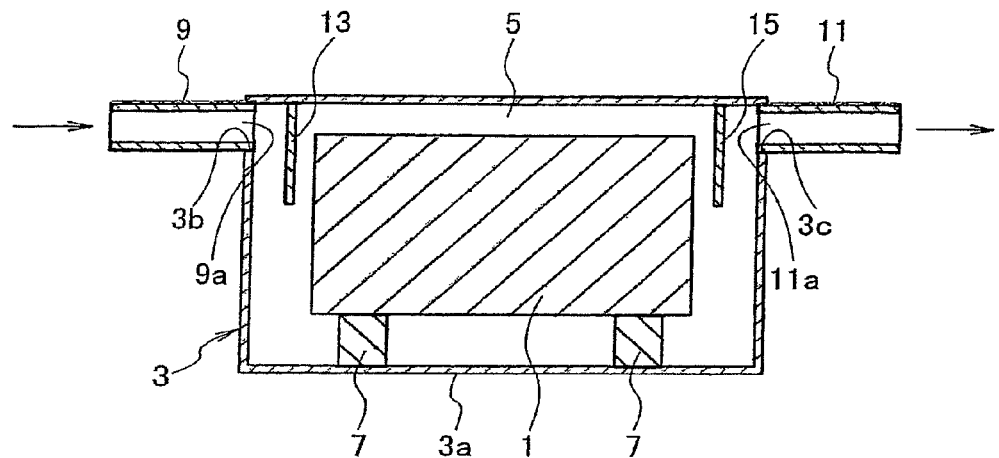
FIG. 1 is a simplified cross sectional view of a first embodiment of the fuel cell housing structure.

FIG. 1 is a simplified cross sectional view of a first embodiment of the fuel cell housing structure as specified according to the invention. A fuel cell 1, which maintains a high electrical potential when the vehicle is running, is sealed within an electrically grounded housing 3, with a space or clearance 5 being provided between the housing 3 and the external parts of the fuel cell 1. The fuel cell 1 is installed within the housing 3 on a floor part 3a supported by insulated mounts 7, thereby forming a structure that electrically insulates the fuel cell 1 from the housing 3.

As FIG. 1 illustrates, a port orifice 3b is formed in the upper side wall on the left side of the housing 3, and connects to a ventilation gas intake port 9 (hereafter referred to as the "intake port 9") which allows external air to enter the space 5. A port orifice 3c is formed in the upper side wall on the right side of the housing 3, and connects to a ventilation gas exhaust port 11 (hereafter referred to as the "exhaust port 11") which allows the gas in the space 5 to be discharged into the external environment.

The intake port 9 and exhaust port 11 thus form a ventilation mechanism able to expel hydrogen gas which has leaked from the fuel cell 1 and accumulated in the space 5. Ventilation air entering the space 5 from the intake port 9 mixes with hydrogen in the space 5 and exits housing 3 from the exhaust port 11. A ventilation fan may also be installed, as appropriate or if required, as a ventilating mechanism.

A baffle plate 13 is installed as a blocking member within the space 5 in a position opposing a port orifice 9a, which opens to the space 5 of the intake port 9. The upper edge of the baffle plate 13 connects to the top of the housing 3, from where the baffle plate 13 extends vertically downward into the space 5 to a point where its lower edge is located slightly above the mid-portion of the fuel cell 1. Therefore, the baffle plate 13 is electrically continuous with the housing 3 but electrically insulated from the fuel cell 1. Of course, the baffle plate(s) can extend different distances vertically downward.

The baffle plate 13, together with the intake port 9, forms an air intake path that terminates in a vertically extending channel that directs any incoming water downward along a path that is substantially parallel to a vertical side wall of the fuel cell but is separated therefrom. This combination (a blocking plate 13 installed within the housing 3 at a location facing the opening of the vent gas intake port 9) may be considered a means for blocking water that enters the housing 3 from the vent gas port 9 from contacting the fuel cell 1, or a means for forming a vertically extending channel that directs incoming water downward toward the bottom of the housing 3 along a path within the buffer space 5 that is separated from vertically oriented sides of the fuel cell 1.

In a similar structure, a baffle plate 15 is installed as a blocking member within the space 5 opposite to a port orifice 11a which serves as a connecting space between the exhaust port 11 and the space 5. The upper edge of the baffle plate 15 connects to the top of the housing 3, from where the baffle plate 15 extends vertically downward into the space 5 to a point where its lower edge is located slightly above the mid-portion of the fuel cell 1. Therefore, the baffle plate 13 is electrically continuous with the housing 3 but electrically insulated from the fuel cell 1.

The baffle plate 15, together with the exhaust port 11, forms an air exhaust path that begins in a vertically extending channel that directs any incoming water downward along a path that is substantially parallel to a vertical side wall of the fuel cell, but is separated therefrom. This combination (a blocking plate 15 installed within the housing 3 at a location facing the opening of the vent gas exhaust port 11) may be considered a means for blocking water that enters the housing 3 from the vent gas port 11 from contacting the fuel cell 1, or a means for forming a vertically extending channel that directs incoming water downward toward the bottom of the housing 3 along a path within the buffer space 5 that is separated from vertically oriented sides of the fuel cell 1.

If the baffle plates 13 and 15 are to prevent water that enters the internal region of the housing 3 from the intake port 9 and exhaust port 11 from reaching the fuel cell 1, the baffle plates 13 and 15 may be located opposite to the port orifices 9a and 11a of the intake and exhaust ports 9 and 11 respectively. Alternatively, the baffle plates 13 and 15 may be structured so that their edge parts extend to opposing walls of the housing 3 in a direction 90 degrees to the FIG. 1 plane.

Moreover, the baffle plates 13 and 15 may be structured so as not to be electrically continuous with the housing 3, while still electrically insulating the fuel cell 1.

The first embodiment is structured to direct water (which has, for example, temporarily entered the intake port 9 or the exhaust port 11 as a result of the fuel cell 1 equipped vehicle being operated in the rain), to fall downward as a result of contact with the baffle plates 13 and 15, and thus prevents invading water from coming into contact with the fuel cell 1, which has a high electrical potential when the vehicle is operating. This first embodiment structure prevents momentary reductions in electrical insulation resistance around the fuel cell 1 which can result from water flowing to the electrically grounded housing 3 from electrically insulated the fuel cell 1, which maintains a high electrical potential.

The space or clearance 5 provides a buffer between the fuel cell and the housing 3, and the internal openings of the intake or exhaust ports 9 or 11 are directed toward the bottom of the buffer space or clearance 5, yet do not face the fuel cell 3 itself at any point. In other words, to prevent the lowering of electrical resistance between a housing and a fuel cell, a fuel cell 1, which maintains a high electrical potential when the vehicle to which it is installed is operating, is housed within electrically insulated and sealable housing 3 so as to provide space 5 between housing 3 and the external part of fuel cell 1. The fuel cell 1 is installed to a floor 3a of housing 3 through insulated mounts 7. A vent gas intake port 9, which directs external air into space 5, connects to the top part of a sidewall of housing 3, and a vent gas exhaust port 11, which vents gas within space 5 to the external environment, is connected to the same location on the opposite sidewall. A baffle plate 13 is installed within a space (buffer clearance) 5 at a location opposing the port orifice 9a of the vent gas intake port 9, and a baffle plate 15 is installed within the space 5 at a location opposing the port orifice 1

Second Embodiment

Figure 2:
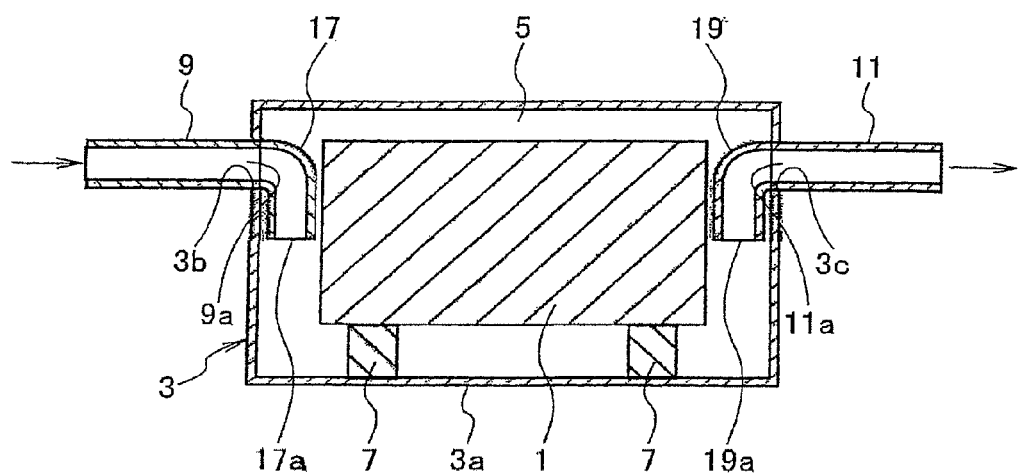
FIG. 2 is a simplified cross sectional view of a second embodiment of the fuel cell housing structure.

FIG. 2 is a simplified cross sectional view of a second embodiment of the fuel cell housing structure. In this embodiment, the blocking member takes the form of a pipe 17 and a pipe 19 instead of the baffle plates 13 and 15.

One end of the pipe 17 connects to the port orifice 9a of the intake port 9, and the other end of the pipe (terminating end 17a) bends vertically downward into the space 5 in a direction not opposing (not facing) the fuel cell 1. Also, one end of the pipe 19 connects to the port orifice 11a of the exhaust port 11, and the other end (beginning end 19a) bends vertically downward into the space 5 in a direction other than that opposing (facing) the fuel cell 1.

The second embodiment is structured to direct any water which may temporarily enter the intake port 9 or exhaust port 11 (as a result of the fuel cell 1 equipped vehicle operating in the rain), to fall downward through the pipes 17 and 19, and thus prevents the water from coming into contact with the fuel cell 1, which has a high electrical potential when the vehicle is running. This second embodiment structure, in the same manner as the first embodiment structure, prevents a momentary reduction in electrical insulation resistance around the fuel cell 1, which may result from water flowing to the electrically grounded housing 3 from the electrically insulated fuel cell 1 which maintains a high electrical potential.

The pipes 17a/19a each form an air intake/exhaust path that terminates/begins in a vertically extending channel that directs any incoming water downward along a path that is generally parallel to a vertical side wall of the fuel cell, but is separated therefrom. Each pipe combination (a pipe 17a/19a, one end of the pipe being installed in the housing 3 at an opening of the vent gas intake port 9 or vent gas exhaust port 11, a remaining end of the pipe 17a/19a extending into the space 5 within the housing 3 in a direction other than a direction facing the fuel cell) may be considered a means for blocking water that enters the housing 3 from the vent gas port 9 or 11 from contacting the fuel cell 1, or a means for forming a vertically extending channel that directs incoming water downward toward the bottom of the housing 3 along a path within the buffer space 5 that is separated from vertically oriented sides of the fuel cell 1.

Third Embodiment

Figure 3:
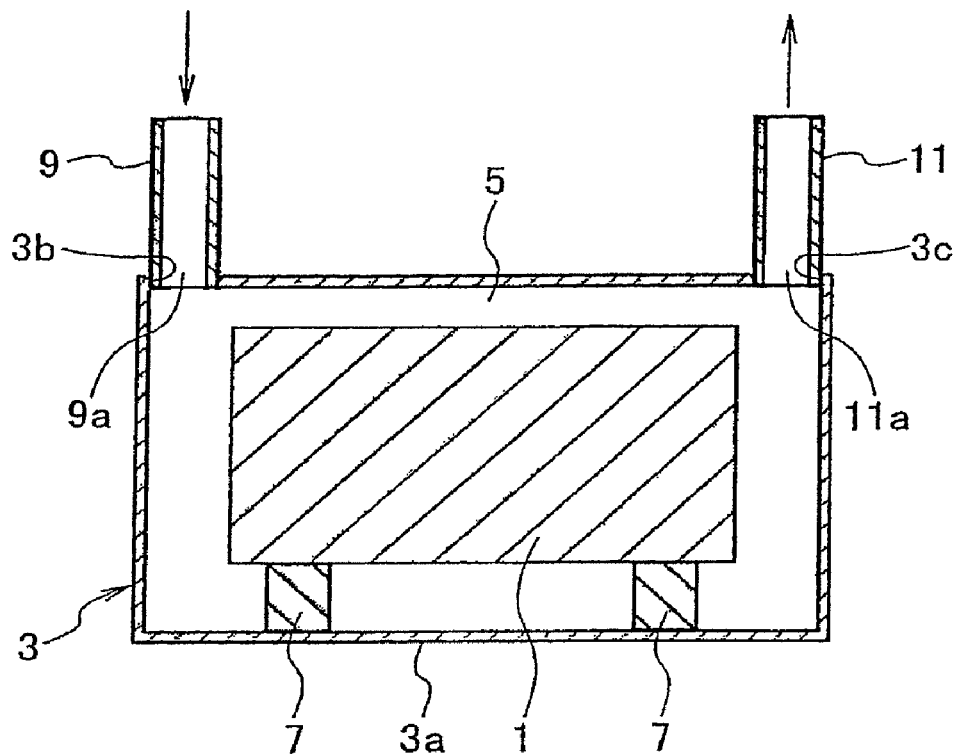
FIG. 3 is a simplified cross sectional view of a third embodiment of the fuel cell housing structure.

FIG. 3 is a simplified cross sectional view of a third embodiment of the fuel cell housing structure. In this third embodiment structure, an orifice 3b is formed on the left side in the top of the housing 3 as viewed in FIG. 3, and connects to the intake port 9 which directs air into the space 5. Also, an orifice 3c is formed on the right side in the top of the housing 3, as can be seen in FIG. 3, and connects to the exhaust port 11 which vents out gas from the space 5.

The intake port 9 and the exhaust port 11 each form a vertically disposed opening or tube exiting to the external environment. The port orifices 9a and 11a, which respectively connect to the orifices 3b and 3c of the housing 3, are horizontal openings to the space 5 which are located so as not to be directed toward (i.e., do not face) the fuel cell 1. As shown in the drawings, the port orifices 9a and 11a optionally slightly extend so as to form a lip.

Fuel cell 1 is installed within the housing 3 through the insulator mounts 7, and the space 5 is provided around the external parts of the fuel cell 1 in the same manner as that of the first and second embodiments.

The third embodiment is structured to allow water, which has temporarily entered the intake port 9 or the exhaust port 11 as a result of the fuel cell 1 equipped vehicle operating in the rain, to fall directly downward, and thus prevents water from coming into contact with the fuel cell 1, which has a high electrical potential when the vehicle is operating. This third embodiment structure, in the same manner as described for the first and second embodiment structures, prevents momentary reductions in electrical insulation resistance around the fuel cell 1, which may result from water flowing to the electrically grounded housing 3 from the electrically insulated fuel cell 1 which maintains a high electrical potential.

The ports and orifices 9/9a and 11/11a each form an air intake/exhaust path that terminates/begins in a vertically extending channel that directs any incoming water downward along a path that is parallel to a vertical side wall of the fuel cell, but is separated therefrom. Each port/orifice combination (a port 9 or 11, one end of the port 9 or 11 extending into the space 5 within the housing 3 and having an orifice 9a or 11a that faces in a direction other than a direction facing the fuel cell 1) may be considered a means for blocking water that enters the housing 3 from the vent gas port 9 or 11 from contacting the fuel cell 1, or a means for forming a vertically extending channel that directs incoming water downward toward the bottom of the housing 3 along a path within the buffer space 5 that is separated from vertically oriented sides of the fuel cell 1. The orifices 9a and 11a can be considered first and second orifices, respectively, that are formed in the top of the housings 3. The orifices 9a and 11a are not aligned with the fuel cell 1 with respect to the center axes of the first and second orifice in the top of the housing All of the embodiments described herein locate the exhaust port 11 at the upper part of the housing 3, therefore providing a mechanism able to efficiently propagate the discharge of hydrogen gas which collects easily in the upper part of the housing 3. At the same time, this is an advantageous feature, but not a necessary one, of the invention.

Moreover, each intake port 9 and exhaust port 11 of the previously described embodiments may be disposed at a location above, or on the same level as, the fuel cell. Further, features of the various embodiments can be combined within the scope of the present invention.

The fuel cell housing according to one version of the invention is structured to include a blocking member in the form of a baffle plate disposed within the internal space of the housing in opposition to at least of one of the vent gas intake and exhaust ports. Therefore, even if water should enter the housing from the vent gas intake port or exhaust port, the water is prevented from coming into contact with the fuel cell by being blocked and then directed to drop downward by the blocking member, and thus the problem of momentary reductions in insulation resistance, which can result from water flowing from the fuel cell onto the housing, is eliminated.

The blocking member may be structured in the form of a pipe disposed within the internal space of the housing and installed to at least one of the vent gas intake and exhaust ports, one end of the pipe connecting to an orifice leading to the space within the housing, and the other end being disposed in a direction not opposing (facing) the fuel cell. Therefore, even if water should enter the housing from the vent gas intake port or exhaust port, the water is prevented from coming into contact with the fuel cell by being directed downward toward the bottom of the housing by the pipe, and thus the problem of momentary reductions in insulation resistance, which may result from water flowing off of the fuel cell onto the housing, is eliminated.

One (upper) end of each pipe is connected to the opening to the space within the housing. The other end of the pipe, that is, the end opposite the upper end, is disposed in a vertical direction. Therefore, water which may enter the housing from the ventilation gas intake port or exhaust port is directed, by the pipe, to fall into the bottom part of the housing, thus eliminating the problem of momentary reductions in insulation resistance which would otherwise result from water flowing off of the fuel cell onto the housing.

The fuel cell is housed within a housing in an electrically insulated condition, the housing having vent gas intake and exhaust ports connecting to a buffer clearance (space) within the housing surrounding the fuel cell. At least one of the ventilation gas intake and exhaust ports is disposed at a location above or on the same level as an upper surface of the fuel cell. As a result of one of the vent gas intake and exhaust ports providing a vertical opening to the external environment, and as a result of the opening being arranged facing the buffer clearance (space) in a direction not facing the fuel cell, water (which may enter the housing through the vent gas intake port or exhaust port) is directed to fall in a direction away from the fuel cell, and does not contact the fuel cell, and thus momentary reduction in insulation resistance is prevented.

At least one of the previously described intake or exhaust ports connects to the top of the housing at a location horizontally displaced from the fuel cell. Therefore, water, which may enter the housing from the ventilation gas air intake port or exhaust port, is prevented from coming into contact with the fuel cell by being directed to fall downward toward the bottom part of the housing, thus eliminating the problem of momentary reductions in insulation resistance which would otherwise result from water flowing off of the fuel cell onto the housing.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its versions. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims. Alternative structures discussed for the purpose of highlighting the invention's advantages do not constitute prior art unless expressly so identified. No one or more features of the present invention are necessary or critical unless otherwise specified.

What is claimed is:

1. A fuel cell housing structure comprising:
    a fuel cell;
    an electrically insulated housing containing the fuel cell, the housing arranged with respect to the fuel cell to form a space within the housing that surrounds the fuel cell;
    a vent gas intake port provided in the housing; and
    a vent gas exhaust port provided in the housing,
    at least one of the vent gas intake port and the vent gas exhaust port being fluidly connected to the space at a position above or on the same level as the fuel cell,
    the at least one of the vent gas intake port and the vent gas exhaust port forming at least one of:
        a vertically extending opening that opens to the external environment, and
        an opening that faces the space in a direction other than a direction facing the fuel cell, and
    the at least one of the vent gas intake port and the vent gas exhaust port being formed directly above a vertically extending buffer portion of the space surrounding the fuel cell, the vertically extending buffer portion of the space being formed continuous and unobstructed between a vertically oriented side of the fuel cell and a vertically oriented side of the housing.

2. The fuel cell housing structure according to claim 1, wherein
    at least one of the vent gas intake port and the vent gas exhaust port is fluidly connected to an orifice in a top of the housing at a location that is not aligned with the fuel cell with respect to an axis of the orifice in the top of the housing.

3. The fuel cell housing structure according to claim 1, wherein
    the vent gas intake port is fluidly connected to a first orifice in a top of the housing at a location that is not aligned with the fuel cell with respect to an axis of the first orifice in the top of the housing; and
    the vent gas exhaust port is fluidly connected to a second orifice in the top of the housing at a location that is not aligned with the fuel cell with respect to an axis of the second orifice in the top of the housing.

4. The fuel cell housing structure according to claim 1, wherein
    the vent gas intake port includes a vertically extending tube.

5. The fuel cell housing structure according to claim 1, wherein
    the vent gas exhaust port includes a vertically extending tube.

6. The fuel cell housing structure according to claim 1, wherein
    each of the vent gas intake port and the vent gas exhaust port includes a vertically extending tube.

7. The fuel cell housing structure according to claim 6, wherein
    the vent gas intake port and the vent gas exhaust port are located at opposite ends of the housing.

8. The fuel cell housing structure according to claim 6, wherein
    the vent gas intake port is fluidly connected to a first orifice in a top of the housing at a location that is not aligned with the fuel cell with respect to an axis of the first orifice in the top of the housing; and
    the vent gas exhaust port is fluidly connected to a second orifice in the top of the housing at a location that is not aligned with the fuel cell with respect to an axis of the second orifice in the top of the housing.

9. The fuel cell housing structure according to claim 8, wherein
    the vent gas intake port and the vent gas exhaust port are located at opposite ends of the housing.

10. The fuel cell housing structure according to claim 1, wherein
    the at least one of the vent gas intake port and the vent gas exhaust port is arranged with respect the fuel cell such that water is prevented from contacting with an external part of the fuel cell by directing water entered into the housing from the at least one of the vent gas intake port and the vent gas exhaust port into the vertically extending buffer portion of the space that is formed between the vertically oriented side of the fuel cell and the vertically oriented side the housing.

11. The fuel cell housing structure according to claim 1, wherein
    each of the vent gas intake port and the vent gas exhaust port is arranged with respect to the fuel cell such that water is prevented from contacting with an external part of the fuel cell by directing water entered into the housing from the vent gas intake port into the vertically extending buffer portion of the space and by directing water entered into the housing from the vent gas exhaust port into a second buffer portion of the space.

12. The fuel cell housing structure according to claim 11, wherein
    each of the vent gas intake port and the vent gas exhaust port includes a vertically extending tube.

13. The fuel cell housing structure according to claim 12, wherein
    the vent gas intake port and the vent gas exhaust port are located at opposite ends of the housing.

14. The fuel cell housing structure according to claim 12, wherein
    the vent gas intake port is fluidly connected to a first orifice in a top of the housing at a location that is not aligned with the fuel cell with respect to an axis of the first orifice in the top of the housing; and
    the vent gas exhaust port is fluidly connected to a second orifice in the top of the housing at a location that is not aligned with the fuel cell with respect to an axis of the second orifice in the top of the housing.

15. The fuel cell housing structure according to claim 14, wherein
    the vent gas intake port and the vent gas exhaust port are located at opposite ends of the housing.

16. The fuel cell housing structure according to claim 2, wherein
    the space includes a horizontally extending portion that extends between the fuel cell and the top of the housing in a direction parallel to a top of the fuel cell, and the orifice in the top of the housing opens in a direction different from the direction of the horizontally extending portion.

17. The fuel cell housing structure according to claim 16, wherein the orifice in the top of the housing opens in a perpendicular direction with respect to the top of the housing.

* * * * *